(No Model.)
J. G. EBERHARD.
VEHICLE HUB CAP.
No. 301,103. Patented July 1, 1884.
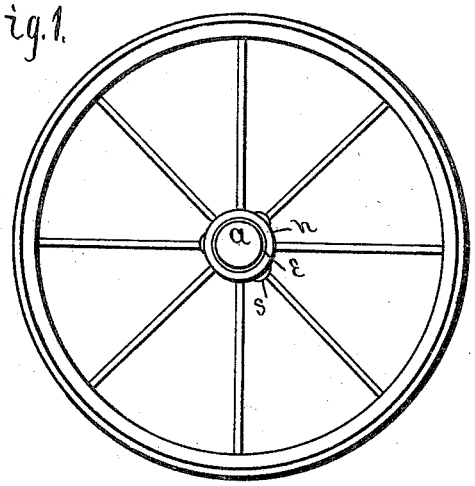
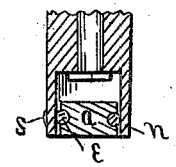
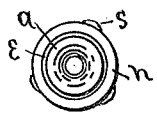
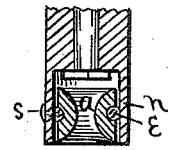
Attest
O. P. Sperra
George F. Robinson
Inventor
John G. Eberhard
By Bradford Howland
Attorney

UNITED STATES PATENT OFFICE.

JOHN G. EBERHARD, OF AKRON, OHIO.

VEHICLE-HUB CAP.

SPECIFICATION forming part of Letters Patent No. 301,103, dated July 1, 1884.

Application filed February 7, 1884. (No model.)

*To all whom it may concern:*

Be it known that I, JOHN G. EBERHARD, a citizen of the United States, residing at Akron, Summit county, Ohio, have invented a new and useful Improvement in Vehicle-Wheels, of which the following is a specification.

My invention consists of a vehicle-wheel hub provided with a front piece of glass or porcelain in the place of the ordinary plated metallic linings or caps, which easily tarnish and lose their luster.

In the drawings forming a part of this specification, Figure 1 is a front elevation of a vehicle-wheel, and Fig. 2 is a horizontal section of the front part of the hub. Fig. 3 is a front view of the hub with a modified form of front piece or lining of glass, and Fig. 4 is a horizontal section of Fig. 3.

The front piece, $a$, is made of glass or porcelain of any desired color and form. The material of which it is composed is not liable to rust or to lose its luster when washed or cleaned. This front piece is more particularly adapted for pleasure-carriages and small carriages for children, as a fine effect is produced by using for the front piece glass or china of brilliant colors, or by placing gold-leaf or silver-leaf at the back side of the glass. Front piece, $a$, is formed with a circumferential groove, in which is placed a ring-shaped cushion, $e$, of rubber or other suitable material. It is closely fitted in the hub-band $n$, with the circumference of the glass front piece, $a$, nearly but not quite in contact with the inner surface of hub-band $n$, where it is held in place by screws $s$, which pass through the hub-band into cushion $e$. I do not deem it essential that front piece, $a$, be formed with groove, or that cushion $e$ be used, as the glass front piece may be used, if preferred, in direct contact with the hub-band, and held in place by any ordinary and well-known means.

The front piece, $a$, may be of disk form, as shown in Fig. 1, or with a central opening in the form of lining, as shown in Fig. 3; and if the hub-band be of polyhedral form the periphery of the front piece should conform to its shape.

I claim as my invention—

1. A glass or porcelain front piece shaped to conform to the inner circumference of and in combination with the point-band $n$ of a vehicle-hub, substantially as described.

2. A glass or porcelain front piece formed with a circumferential groove containing a cushion, in combination with a vehicle-hub, substantially as described.

JOHN G. EBERHARD.

Witnesses:
 GEO. I. ROBINSON,
 BRADFORD HOWLAND.